UNITED STATES PATENT OFFICE.

ALFONSO A. MAGLAUGHLIN, OF COLDWATER, MICHIGAN, ASSIGNOR OF ONE-HALF HIS RIGHT TO LLEWELLEN H. JOHNSON, OF SAME PLACE.

IMPROVEMENT IN COMPOUNDS FOR INSULATING TELEGRAPH-WIRES.

Specification forming part of Letters Patent No. 163,221, dated May 11, 1875; application filed February 8, 1875.

*To all whom it may concern:*

Be it known that I, ALFONSO A. MAG-LAUGHLIN, of Coldwater, in the county of Branch, in the State of Michigan, have invented a new and useful Improvement in Compounds for Insulating Telegraph-Wires, and other metallic substances when laid under ground; and I do hereby declare that the following is a full, clear, and exact description of the ingredients composing, and the mode of compounding, the same.

My invention relates to that class of compounds used for insulating and preserving telegraph-wires, and other metallic substance when laid under ground. It consists in the combination of pine-tar, coal-tar, resin, coke, and india-rubber, in the manner and proportions hereinafter set forth.

To prepare the compound, I take eleven (11) pounds of pine-tar and four (4) pounds of coal-tar and mix them over a fire in a suitable vessel. When thoroughly assimilated, and heated to a proper temperature, I add fifty (50) pounds of rosin. When the rosin is melted, and thoroughly stirred in and mixed with the tar, I determine the consistency of the mixture as follows: I take a small quantity and drop it into cold water to cool it. If, on taking it from the water, and slightly working or manipulating, it becomes soft and plastic, so that it will draw out in long fine cords or fibers, it is right; but if, on the contrary, it is soft and inadhesive, so that it will pull apart or separate on being slightly drawn out, it should have more rosin added to bring it to the proper state of adhesiveness.

This addition of rosin above the amount stated is caused by the difference in the quality of the tar which may be used, the amount stated being the minimum required for tar of best quality.

The foregoing ingredients being thoroughly mixed as described, I add thereto sixteen (16) pounds of coke thoroughly pulverized, and stir till well mixed through the mass. The vessel containing the compound is now removed from the fire, and to the mixture I stir in three and one-half ($3\frac{1}{2}$) pounds of india-rubber, the latter having been previously brought to a liquid state by proper solvents.

When cool it is ready for use. It is in a soft or plastic state, and requires to be held to the wires by a suitable casing or boxing.

I use a wooden trough or tube, constructed to hold one, two, or any desired number of wires. The wood composing this trough is first thoroughly saturated with coal-tar, so that when placed in the earth it will not decay.

The wires are held up off the bottom of the trough by suitable buttons or cross-pieces, placed at suitable distances apart.

The trough, with its top board removed, is placed in the trench dug for the purpose in the earth. The wires are stretched therein and rest on the cross-pieces. It is then filled with the insulating compound, so as to perfectly inclose or envelop said wires. The top board is now nailed or screwed on, and the trench filled up.

It will be seen that the use of poles, and the annoyance and expense of their frequent breaking down and re-erection are avoided.

My compound will not decay, and when once laid will protect and preserve the wires in perfect working order for indefinitely long time.

Should it be desired to take up or lay a wire, it will be seen that this can readily be done without disturbing the other wires in the box.

The compound, while somewhat affected by heat and cold, will preserve its plastic state under either condition sufficiently to permit of easy handling.

Having described my invention, what I claim, and desire to secure by Letters Patent, is—

An insulating material composed of pine-tar, coal-tar, rosin, coke, and india-rubber, mixed and compounded in the proportions and manner substantially as herein set forth.

In testimony that I claim the foregoing as my own I hereto affix my signature in presence of two witnesses this 8th day of February, 1875.

ALFONSO A. MAGLAUGHLIN.

Witnesses:
GEO. H. BORGER.
W. BURRIS.